Patented Dec. 28, 1943

2,337,856

UNITED STATES PATENT OFFICE 2,337,856

PROCESS OF RETARDING THE CORROSION OF METAL BY WATER

Owen Rice and George B. Hatch, Pittsburgh, Pa., assignors to Hall Laboratories, Inc., Pittsburgh, Pa., a corporation of Pennsylvania No Drawing. Application October 27, 1942, Serial No. 463,544

12 Claims. (Cl. 117—127)

This invention relates generally to the treatment of water and more particularly to the treatment of water to prevent or retard the corrosion of metals by the water.

This application is a continuation-in-part of our application, Serial No. 273,585, filed May 13, 1939.

The corrosion of pipe lines and other parts of water distribution systems by the oxygen in the water has presented a problem for a number of years. This corrosion in the case of ferrous metals, produces iron rust which renders the water unsuitable for many uses. Tuberculation, with the resulting decrease in the carrying capacity of the lines, is also a very serious result of corrosion. Eventual destruction of the line itself may even result from corrosion. In the past, various methods have been resorted to in an attempt to overcome this corrosion. It is known that the metal can be protected from the corrosive action of the water, by laying down a deposit of calcium carbonate. This is the method which has been employed with certain types of waters. Where the water contains sufficiently large quantities of bicarbonate ($HCO_3$) hardness, it may be treated with lime, in order to convert the bicarbonate into carbonate, which then combines with the calcium to form the calcium carbonate film or coating on the metal. This method, however, is only applicable to waters containing relatively large amounts of bicarbonate radical and is inapplicable to waters which are low in bicarbonate. If the water to be treated is low in bicarbonate ion, it may be treated by adding a carbonate, such as sodium carbonate, to supply sufficient carbonate ($CO_3$) radical to form a deposit of calcium carbonate with the calcium present in the water. This method, however, is objectionable due to the high cost of sodium carbonate.

In accordance with the present invention, we do not rely on the formation of a film of calcium carbonate to protect the metal from corrosion. Our invention provides a process for treating acid or alkaline water which does not contain sufficient concentrations of Ca and $CO_3$ ion to cause the formation of a protective film of calcium carbonate under the conditions in which the water is present.

According to the preferred method of the present invention, we treat water which does not contain sufficient Ca and $CO_3$ ions to form a protective coating of calcium carbonate on the metal, or where the protective coating is insufficient to provide adequate protection to the metal, by adding to such water a very small amount of sodium metaphosphate or other alkali-metal metaphosphate. The sodium metaphosphate is the commonest metaphosphate and will be referred to specifically in the description of the process. The amount of sodium metaphosphate added to the water is substantially less than the stoichiometric amount required to form the soluble complex of calcium and sodium metaphosphate. The amount of sodium metaphosphate added to the water is substantially less than that required according to Hall Reissue Patent 19,719 for preventing the precipitation of calcium carbonate or for softening the water against soap. As explained in that patent, if a solution of sodium hexametaphosphate is slowly added to a hard water containing sufficient calcium, a white cloudy precipitate is first formed. This precipitate is believed to be calcium metaphosphate, whose simplest formula may be expressed as $Ca(PO_3)_2$. In order to convert all of the calcium into calcium metaphosphate, it is necessary to add two formula weights of sodium metaphosphate ($NaPO_3$) for each formula weight of calcium (Ca). This proportion of sodium metaphosphate is insufficient to produce effective softening of the water and according to the Hall patent an amount of sodium metaphosphate in excess of that to theoretically combine with the calcium to form calcium metaphosphate $Ca(PO_3)_2$ is used. When one additional formula weight of sodium metaphosphate is used for each formula weight of calcium, that is when three formula weights of sodium metaphosphate are used for each formula weight of calcium, a soluble complex of sodium and calcium metaphosphate $Na_2(Ca_2P_6O_{18})$ is formed, thereby redissolving the calcium metaphosphate precipitate. Where it is desired to soften the water against soap, it is pointed out in the patent that four formula weights of sodium metaphosphate should be used for each formula weight of calcium.

In accordance with the present invention, we use only such a small amount of sodium metaphosphate as will cause the formation of a film of $Ca(PO_3)_2$ or some calcium metaphosphate complex on the metal to be protected. The amount of metaphosphate which we use does not exceed two formula weights for each formula weight of calcium. If an excess of sodium metaphosphate beyond this proportion were used, it would begin to dissolve the film or deposit and allow the water to attack the metal. Since three formula weights of sodium metaphosphate are required for each formula weight of calcium in order to form the soluble complex $Na_2(Ca_2P_6O_{18})$ and since according to the present invention we do not use more than two formula weights of sodium metaphosphate for each formula weight of calcium, it follows that the amount of sodium metaphosphate which we employ does not exceed ⅔ the stoichiometric amount required to form the soluble complex $Na_2(Ca_2P_6O_{18})$. The lower range of the amount of sodium metaphosphate is the least amount which will combine with the calcium to form a calcium metaphosphate film of sufficient thickness to effectively protect the pipe against corrosion. I may use as low as 0.1 p. p. m. of sodium hexametaphosphate or as much as two formula weights of sodium metaphosphate for each formula weight of calcium.

The importance of using the correct amount of sodium metaphosphate for preventing corrosion of ferrous metals by water is seen from the different effects produced when the quantities of sodium metaphosphate used are widely varied. As just explained, the use of sodium metaphosphate in amount less than two formula weights of the metaphosphate for each formula weight of calcium produces the protective film of calcium metaphosphate. On the other hand, if quantities of sodium metaphosphate beyond three or four formula weights for each formula weight of calcium are used, the corrosion of the pipe lines is actually increased, due, it is believed, to the formation of a soluble complex of iron and sodium metaphosphate.

The protective action against corrosion obtained according to the present invention is believed to be due to the formation of an adsorbed film of calcium metaphosphate $Ca(PO_3)_2$. Such a film not only is different in chemical composition from the calcium carbonate films relied on according to prior methods for protection against corrosion but is believed to be an adsorbed film as distinguished from one which is merely deposited on to the metal. This adsorbed film will exist in contact with water in which the concentration of Ca and $PO_3$ ions is less than the solubility product of $Ca(PO_3)_2$. As contrasted with this, a $CaCO_3$ deposit will only exist in contact with water in which the concentration of Ca and $CO_3$ ions exceeds the solubility product of $CaCO_3$. Furthermore, the film of calcium metaphosphate is of a character which does not build up in thickness over a period of time.

The present invention is particularly applicable for preventing corrosion of metal by water which contains very little bicarbonate hardness. One example of such a water is the municipal water supply for the city of Pittsburgh. This water contains on the average about:

|   | P. p. m. |
|---|---|
| Bicarbonate hardness | 8 |
| Calcium | 28 |
| Total hardness | 90 |

This water is corrosive to pipe lines, due to the fact that it does not have sufficient concentrations of Ca and $HCO_3$ ions so that a protective film of calcium carbonate will be formed under the conditions in which the water is used. If this water is heated or has an alkali added to it, the bicarbonate will be converted into carbonate but there is insufficient carbonate ion formed to react with the calcium to form the protective film of calcium carbonate. This water may be treated, however, according to the present invention to form the protective film of calcium metaphosphate $Ca(PO_3)_2$. According to the invention, we treat waters having a zero or negative coefficient according to the Langelier index. This index is well known and is referred to in an article by W. F. Langelier in "The Journal of the American Water Works Association," 28:1500 (1936). It gives a measure of the tendency of the water to lay down a protective film of calcium carbonate on metal and takes into consideration the temperature of the water, its alkalinity, calcium content, carbonate and bicarbonate contents. Waters having a negative Langelier coefficient will dissolve deposits of calcium carbonate, whereas those having a positive coefficient will deposit calcium carbonate. Those having a zero coefficient will neither lay down nor dissolve calcium carbonate deposits.

We have referred specifically to calcium containing water and to the formation of a protective film of calcium metaphosphate. Magnesium, however, reacts in a similar manner and it is to be understood that the invention includes the formation of a protective film of calcium metaphosphate or the formation of a protective film of magnesium metaphosphate.

The invention has been described with particular reference to the use of sodium metaphosphate, since this is the preferred material, the commonest form of sodium metaphosphate being the hexametaphosphate generally known under the term Graham's salt. However, we may use alkali-metal tripolyphosphates or pyrophosphates in place of the metaphosphates. The tripolyphosphates and pyrophosphates operate in a manner similar to the sodium metaphosphate in first forming precipitates with calcium followed by redissolving of the precipitates upon addition of excess of the tripolyphosphates or pyrophosphates. In carrying out the invention by the use of the tripolyphosphates or pyrophosphates only such a small amount of these materials is employed as will produce the film of calcium tripolyphosphate or calcium pyrophosphate and not such an amount as will cause redissolving of such film.

The alkali-metal metaphosphates, tripolyphosphates and pyrophosphates are "molecularly dehydrated phosphates," as the term is employed in Hall and Jackson Patent 1,903,041. For example, sodium metaphosphate $NaPO_3$ may be considered as derived from monosodium dihydrogen orthophosphate by the removal of water of constitution. Sodium pyrophosphate $Na_4P_2O_7$ may be considered as derived from disodium monohydrogen orthophosphate by the removal of water of constitution. Likewise sodium tripolyphosphate $Na_5P_3O_{10}$ may be considered as derived by molecular dehydration of a mixture of orthophosphates which is intermediate in acidity between the monosodium dihydrogen orthophosphate and the disodium monohydrogen orthophosphate.

By "molecularly dehydrated phosphate" we mean any phosphate which can be considered as derived from a monobasic or dibasic orthophosphate or from orthophosphoric acid or from a mixture of any two of these by elimination of water of constitution therefrom.

While we prefer to use the molecularly dehydrated phosphates such as the metaphosphates, pyrophosphates or polyphosphates of sodium, we may use the molecularly dehydrated phosphates of other alkali-metals, such as potassium, lithium or ammonium. Or we may use the molecularly dehydrated phosphates of any other metal or metals. The essential requirement is that the water be supplied with a molecularly dehydrated phosphate radical and, so far as preventing or retarding corrosion of the metal treated is concerned, any material which will supply such radical may be employed. Thus we may use calcium molecularly dehydrated phosphate, for example calcium metaphosphate, pyrophosphate or polyphosphate. Some molecularly dehydrated phosphates are crystalline, while others are glassy, each being effective according to the present invention. Some molecularly dehydrated phosphates have a high rate of solution, while others have a low rate of solution. We may use either type, provided only that the rate of solution is sufficient to provide in the water the small amounts of molecularly dehydrated phosphate radical required according to the invention.

Although the alkali-metal molecularly dehydrated phosphates are the preferred materials, due to their availability and relatively low cost, we may use the metaphosphates, pyrophosphates or polyphosphates of the alkaline earth metals calcium, strontium or barium, or the metaphosphates, pyrophosphates or polyphosphates of magnesium or the metaphosphates, pyrophosphates or polyphosphates of any of the polyvalent metals aluminum, manganese, zinc, chromium, cadmium, iron or in fact any of the molecularly dehydrated phosphates of any of the metals. We may use the readily soluble sodium metaphosphate glass commonly known as Graham's salt, the crystalline sodium metaphosphate commonly known as Maddrell salt or the "insoluble" potassium metaphosphate. Both of the latter materials are sometimes referred to as "insoluble" but each will supply the small amount of metaphosphate radical necessary to prevent or retard the corrosion of metal according to the present invention. We may use any one or any combination of any of the molecularly dehydrated phosphates which have been referred to or of any other molecularly dehydrated phosphate.

Other examples of crystalline molecularly dehydrated phosphates are sodium-calcium pyrophosphate, sodium-zinc tripolyphosphate and sodium-magnesium tripolyphosphate.

We may use any phosphate glass containing $P_2O_5$ and oxide of one or more of any of the metals above mentioned or of any other metal. These phosphate glasses may have an acid, a neutral or an alkaline reaction. They may be constituted of alkali-metal oxide and $P_2O_5$, or alkaline earth metal oxide or magnesium oxide and $P_2O_5$, or of mixtures of one or more of the alkali-metal oxides, the alkaline earth metal oxides or magnesium oxide and $P_2O_5$. We may use any phosphate glass containing $P_2O_5$ and any of the polyvalent metals above referred to. By "polyvalent" metal we mean any metal whose ion carries more than one positive charge.

Although the molecularly dehydrated phosphates of any metal will retard or prevent the corrosion of the metal being treated, the molecularly dehydrated phosphates of metals which are higher in the electromotive force series of metals than the metal being treated to protect it against corrosion are preferred. Thus for iron, the preferred metals are sodium, potassium, lithium, caesium, rubidium, barium, strontium, calcium, magnesium, aluminum, manganese, zinc, chromium and cadmium. In protecting iron against corrosion, the molecularly dehydrated phosphates of iron and of metals below iron in the electromotive force series of metals, while operative according to the present invention, are less advantageous because of certain of their properties, or because they are not readily available or are high in cost. For instance, where the water may be used for drinking, it is undesirable to add lead or arsenic, because they are poisonous.

Particularly good results in preventing or retarding the corrosion of iron pipes by water have been obtained by adding to the water about 2 to 10 parts per million of a molecularly dehydrated phosphate (metaphosphate) glass having the molar composition of $1\ Na_2O \cdot 2\ CaO \cdot 3\ P_2O_5$.

By the statement in the claims that the material added to the water is a composition comprising molecularly dehydrated phosphate of the group consisting of alkali-metal meta- or polyphosphate, polyvalent metal meta- or polyphosphate and ammonium meta- or polyphosphate, we mean to include not only compositions consisting of alkali-metal meta- or polyphosphate, polyvalent metal meta- or polyphosphate or ammonium meta- or polyphosphate singly, but also compositions containing mixtures or combinations of such phosphates, as for example, the glassy sodium-calcium metaphosphate, the crystalline sodium-calcium pyrophosphate, the sodium-zinc and the sodium-magnesium tripolyphosphates above described.

Where slowly soluble molecularly dehydrated phosphates are used for treating the water, the water may be fed through a bed of the material so as to supply the desired amount of molecularly dehydrated phosphate radical, thus eliminating the necessity of first preparing a solution of the molecularly dehydrated phosphate and feeding the solution to the water to be treated. Examples of such slowly soluble molecularly dehydrated phosphates are as follows:

| Composition, mol per cent | State |
|---|---|
| 45 $Na_2O$, 55 $P_2O_5$ | Glass. |
| $KPO_3$ | Crystal. |
| 28.6 $Na_2O$, 28.6 $CaO$, 42.8 $P_2O_5$ | Glass. |
| 42.5 $Na_2O$, 15 [½ $Al_2O_3$], 42.5 $P_2O_5$ | Do. |
| 20 $K_2O$, 20 $ZnO$, 60 $P_2O_5$ | Do. |
| 16.7 $Na_2O$, 33.3 $CaO$, 50 $P_2O_5$ | Do. |
| $NaPO_3$ (Maddrell salt) | Crystal. |
| 50 $BaO$, 50 $P_2O_5$ | Glass. |
| 40 $Na_2O$, 60 $P_2O_5$ | Do. |
| 50 $CaO$, 50 $P_2O_5$ | Do. |
| 45 $CaO$, 55 $P_2O_5$ | Do. |
| 20 $Na_2O$, 40 $MgO$, 40 $P_2O_5$ | Do. |

In case the water to be treated is very low in calcium ion or other polyvalent ion, which polyvalent ion is to react with the molecularly dehydrated phosphate radical to form the complex corrosion resisting film, such, for example, as in the case of distilled water, we may add polyvalent metal ion thereto to aid in the formation of the protective film.

It is not absolutely essential that the polyvalent metal be added to the water either in the form of a salt or in the form of a molecularly dehydyrated phosphate. A similar, although somewhat less effective, result is obtained when an alkali-metal molecularly dehydrated phosphate alone is added to the water. In this case, if the metal to be protected from corrosion is iron, the alkali-metal molecularly dehydrated phosphate forms a protective film of iron molecularly dehydrated phosphate. The first action is believed to be a slight dissolving of the iron in the water. This is followed by reaction of the iron in solution with the molecularly dehydrated phosphate to form a protective film of iron molecularly dehydrated phosphate.

Although the invention is particularly useful in retarding the corrosion of ferrous metal, it is applicable to retarding corrosion of metals in general. It may be used, for example, in protecting copper, aluminum, or other soft metals or alloys that are ordinarily subject to corrosion.

The invention is not limited to the particular embodiments described, which have been given merely for illustrative purposes, but may be otherwise embodied or practiced within the scope of the following claims.

We claim:

1. The process of retarding the corrosion of metal in contact with water, which comprises adding to the water which is corrosive to the metal and contains insufficient calcium and carbonate ion to deposit calcium carbonate under the conditions in which the water is present, a composition comprising molecularly dehydrated phosphate of the group consisting of alkali-metal meta- or polyphosphate, polyvalent metal meta- or polyphosphate and ammodium meta- or polyphosphate, in amount which is sufficient to form on the metal a protective film of a compound containing polyvalent metal and molecularly dehydrated phosphate radical but which provides molecularly dehydrated phosphate radical in amount which is substantially less than the stoichiometric amount required to form with the polyvalent metal in the water and the polyvalent metal in the molecularly dehydrated phosphate, the soluble complex containing polyvalent metal and molecularly dehydrated phosphate radical.

2. The process of retarding the corrosion of metal by calcium-containing water, which comprises adding to water which is corrosive to the metal and contains insufficient calcium and carbonate ion to deposit calcium carbonate under the conditions in which the water is present, molecularly dehydrated alkali-metal phosphate in amount which is sufficient to form on the metal a protective film of a compound containing calcium and molecularly dehydrated phosphate radical but is substantially less than the stoichiometric amount required to form the soluble complex of calcium and molecularly dehydrated alkali-metal phosphate.

3. The process of retarding the corrosion of metal by calcium-containing water, which comprises adding to water which is corrosive to the metal and contains insufficient calcium and carbonate ion to deposit calcium carbonate under the conditions in which the water is present, sodium metaphosphate in amount which is sufficient to form on the metal a protective film of a compound containing calcium and metaphosphate radical but is substantially less than the stoichiometric amount required to form the soluble complex $Na_2(Ca_2P_6O_{18})$.

4. The process of retarding the corrosion of metal by calcium-containing water, which comprises adding to water which is corrosive to the metal and contains insufficient calcium and carbonate ion to deposit calcium carbonate under the conditions in which the water is present, sodium metaphosphate in amount between 0.1 p. p. m. and $\frac{2}{3}$ the stoichiometric amount required to form the soluble complex $$Na_2(Ca_2P_6O_{18})$$

5. The process of retarding the corrosion of metal by calcium-containing water, which comprises adding to water which is corrosive to the metal and contains insufficient calcium and carbonate ion to deposit calcium carbonate under the conditions in which the water is present, sodium metaphosphate in amount between 0.1 p. p. m. and an amount equivalent to two formula weights of sodium metaphosphate $(NaPO_3)$ for each formula weight of calcium (Ca).

6. The process of retarding the corrosion of metal by calcium-containing water, which comprises adding to water which is corrosive to the metal and contains insufficient calcium and carbonate ion to deposit calcium carbonate under the conditions in which the water is present, sodium metaphosphate in amount sufficient to form and maintain on the metal a protective film of calcium metaphosphate $Ca(PO_3)_2$ but substantially less than the stoichiometric amount required to form the soluble complex of calcium and sodium metaphosphate.

7. The process of retarding the corrosion of metal by calcium-containing water which is corrosive to the metal, which comprises adding to said water having a negative or zero coefficient according to the Langelier index, molecularly dehydrated alkali-metal phosphate in amount which is substantially less than the stoichiometric amount required to form the soluble complex of calcium and molecularly dehydrated alkali-metal phosphate.

8. The process of retarding the corrosion of metal by calcium-containing water which is corrosive to the metal, which comprises adding to said water having a negative or zero coefficient according to the Langelier index, sodium metaphosphate in amount between 0.1 p. p. m. and an amount equivalent to two formula weights of sodium metaphosphate $(NaPO_3)$ for each formula weight of calcium (Ca).

9. The process of retarding the corrosion of metal by calcium-containing water which contains bicarbonate hardness and is corrosive to the metal, which comprises adding to said water having a negative or zero coefficient according to the Langelier index, molecularly dehydrated alkali-metal phosphate in amount which is substantially less than the stoichiometric amount required to form the soluble complex of calcium and molecularly dehydrated alkali-metal phosphate.

10. The process of retarding the corrosion of metal in contact with water, which comprises adding to the water which is corrosive to the metal and contains insufficient calcium and carbonate ion to deposit calcium carbonate under the conditions in which the water is present, molecularly dehydrated phosphate of a polyvalent metal in amount which is sufficient to form on the metal a protective film of a molecularly dehydrated phosphate containing said polyvalent metal.

11. The process of retarding the corrosion of metal in contact with water, which comprises adding to the water which is corrosive to the metal and contains insufficient calcium and carbonate ion to deposit calcium carbonate under the conditions in which the water is present, molecularly dehydrated phosphate of a polyvalent metal which is higher in the electromotive force series of metals than the metal to be protected against corrosion, in amount which is sufficient to form on the metal a protective film of a molecularly dehydrated phosphate containing said polyvalent metal.

12. The process of retarding the corrosion of metal in contact with water, which comprises adding to the water which is corrosive to the metal and contains insufficient calcium and carbonate ion to deposit calcium carbonate under the conditions in which the water is present, molecularly dehydrated alkali-metal phosphate in amount which is sufficient to form on the metal a protective film of a compound containing the metal being treated and molecularly dehydrated phosphate radical but is substantially less than the stoichiometric amount required to form with the metal being treated, the soluble complex containing the metal being treated and molecularly dehydrated phosphate radical.

OWEN RICE
GEORGE B. HATCH.